(12) United States Patent
Fukuoka et al.

(10) Patent No.: US 8,178,234 B2
(45) Date of Patent: May 15, 2012

(54) CELL-TO-CELL CONNECTION STRUCTURE

(75) Inventors: Takahiro Fukuoka, Kanagawa (JP); Masahiko Kato, Kanagawa (JP)

(73) Assignee: Panasonic Corporation, Osaka (JP)

( * ) Notice: Subject to any disclaimer, the term of this patent is extended or adjusted under 35 U.S.C. 154(b) by 782 days.

(21) Appl. No.: 11/918,457

(22) PCT Filed: Mar. 31, 2006

(86) PCT No.: PCT/JP2006/306857
§ 371 (c)(1),
(2), (4) Date: Oct. 20, 2008

(87) PCT Pub. No.: WO2006/112251
PCT Pub. Date: Oct. 26, 2006

(65) Prior Publication Data
US 2009/0068555 A1    Mar. 12, 2009

(30) Foreign Application Priority Data
Apr. 14, 2005  (JP) .................................. 2005-116373

(51) Int. Cl.
*H01M 6/42* (2006.01)
*H01M 2/24* (2006.01)
(52) U.S. Cl. .......................... 429/160; 429/149; 429/156
(58) Field of Classification Search .................. 429/149, 429/156, 160
See application file for complete search history.

(56) References Cited

U.S. PATENT DOCUMENTS

| | | | | |
|---|---|---|---|---|
| 5,900,332 A | * | 5/1999 | Marukawa et al. | ........... 429/158 |
| 7,270,576 B2 | * | 9/2007 | Kim et al. | ..................... 439/627 |
| 7,550,228 B2 | * | 6/2009 | Izawa | ........................... 429/160 |

| | | | |
|---|---|---|---|
| 2002/0086205 A1 | | 7/2002 | Payen et al. |

(Continued)

FOREIGN PATENT DOCUMENTS

JP     09-050836     2/1997

(Continued)

OTHER PUBLICATIONS

English translation of International Preliminary Report on Patentability and Written Opinion of the International Searching Authority, issued in International Patent Application No. PCT/JP2006/306857, dated Oct. 16, 2007.

(Continued)

*Primary Examiner* — Patrick Ryan
*Assistant Examiner* — Julian Anthony
(74) *Attorney, Agent, or Firm* — McDermott Will & Emery LLP

(57) ABSTRACT

Cell-to-cell connection plates (1) each integrally having a welding part (2) shaped to fall within a circular end of a battery case (7) and a connecting part (2) extending from this welding part (2) are provided. The cell-to-cell connection plates (1) are attached to one electrode terminal and the other electrode terminal of the battery case (7) by welding the welding parts (2), respectively. The connecting parts (3) of the respective cell-to-cell connection plates (1) attached to each adjoining pair of cylindrical batteries (Ba) are overlapped with each other and coupled into electric connection. Consequently, regardless of whether a plurality of cylindrical batteries (Ba) are axially arranged in series or radially juxtaposed, each adjoining two can be connected to each other by using the identical cell-to-cell connection plates (1) for cost reduction. It is also possible to provide a sufficient heat dissipation effect and achieve sufficient robustness and weight saving even when connecting large-sized cylindrical batteries.

18 Claims, 5 Drawing Sheets

U.S. PATENT DOCUMENTS

| | | |
|---|---|---|
| 2003/0215702 A1 | 11/2003 | Tanjou et al. |
| 2004/0043287 A1 | 3/2004 | Bando et al. |
| 2004/0053126 A1 | 3/2004 | Hirano et al. |
| 2005/0079408 A1 | 4/2005 | Hirano |

FOREIGN PATENT DOCUMENTS

| | | |
|---|---|---|
| JP | 09-223494 | 8/1997 |
| JP | 11-297300 | 10/1999 |
| JP | 2002-151045 | 5/2002 |
| JP | 2002-184385 | 6/2002 |
| JP | 2002-231192 | 8/2002 |
| JP | 2002-246005 | 8/2002 |
| JP | 2003-162993 | 6/2003 |
| JP | 2004-031227 | 1/2004 |
| JP | 2004-178860 | 6/2004 |

OTHER PUBLICATIONS

Extended European Search Report issued in European Patent Application No. EP 06730806.6 dated Nov. 24, 2011.

* cited by examiner

CELL-TO-CELL CONNECTION STRUCTURE

RELATED APPLICATIONS

This application is the U.S. National Phase under 35 U.S.C. §371 of International Application No. PCT/JP2006/306857, filed on Mar. 31, 2006, which in turn claims the benefit of Japanese Application No. 2005-116373, filed on Apr. 14, 2005, the disclosures of which Applications are incorporated by reference herein.

TECHNICAL FIELD

The present invention relates to a cell-to-cell connection structure for constituting a battery module or a battery pack which primarily has a plurality of cylindrical batteries connected in series or in parallel for getting a desired output voltage.

BACKGROUND ART

In recent years, AV equipment or electronic equipment including personal computers and portable communication devices has been pushed toward portable and cordless configurations at high speed. For a driving power source of these electric devices, nickel cadmium storage batteries, nickel metal-hydride storage batteries, lithium secondary batteries, and the like have been used since they have high reliability and easy maintainability. Meanwhile, lead-acid storage batteries are in the current mainstream of such applications as an emergency backup power source intended for power failures occurring from disasters like an earthquake and typhoon, whereas the use of nickel metal-hydride storage batteries having high capacity, capable of a high-current discharge, is expected in the future. Nickel metal-hydride storage batteries having high capacity are also expected to be adopted for an emergency power source in unattended communication stations or the like and for railway power applications such as a power source for moving a train pantograph up and down and a lighting backup power source to be used when a railway power feed fails.

Power sources as mentioned above are typically assembled in the form of a battery module or a battery pack by connecting the opposite power terminals of a plurality of cylindrical batteries to each other. The cell-to-cell connection structures to be used for constituting this battery module or battery pack are broadly classified into two, depending on the cell arrangement. One is to arrange a plurality of batteries Ba1 and Ba2 along the axial direction as shown in FIG. 8, and connect each adjoining pair of batteries Ba1 and Ba2 in series (for example, see Patent Document 1). In this cell-to-cell connection structure, a bowl-shaped connector 50 interposed between two batteries Ba1 and Ba2 is connected to both a sealing plate 52 having a metal cap 51 formed thereon, as a positive electrode terminal of one battery Ba1, and a battery case, as a negative electrode terminal of the other battery Ba by projection welding respectively.

More specifically, the connector 50 comprises a cylindrical part 50a to be fit onto a battery case 53, and a flat part 50b to make contact with a sealing plate 52. Projections 50c are formed on the inner surface of the cylindrical part 50a and the outer surface of the flat part 50b in respective locations on the same radii at regular intervals of 90°. By projection welding via the foregoing projections 50c, the flat part 50b of the connector 50 is connected to the sealing plate 52 that is electrically connected with the metal cap 51 of the one battery Ba1, and the cylindrical part 50a is connected to the battery case 53 of the other battery Ba2. An electric short circuit between the battery case 53 of the one battery Ba1 and the connector 50 is precluded by an insulation ring. The two batteries Ba1 and Ba2 are thus electrically connected in series.

The other cell-to-cell connection structure is to juxtapose a plurality of batteries Ba3 and Ba4 in a radial direction and establish a series connection by using a connecting member 59 as shown in FIG. 9 (for example, see Patent Document 2). In this cell-to-cell connection structure, the outer surface of a positive electrode terminal 60 at an end face of one battery Ba3 and an exposed bottom 55a, at the other end face, of a battery case 55 of the other battery Ba4 are juxtaposed so that they are flush with each other while the peripheries are in close contact with each other. In this state, the connecting member 59 is interposed across the two, and this connecting member 59 and the batteries Ba3 and Ba4 are welded for electric connection. More specifically, a first connecting part 61 of this connecting member 59 is welded to the bottom 55a of the battery case 55, and an annular recessed portion of a second connecting part 62 thereof is welded to a sealing plate 64.

[Patent Document 1] Japanese Patent Laid-Open Publication No. 2003-162993
[Patent Document 2] Japanese Patent Laid-Open Publication No. 2002-246005

DISCLOSURE OF THE INVENTION

Problems to be Solved by the Invention

With the cell-to-cell connection structure of FIG. 8, however, the battery module constituted by using this has an oblong columnar appearance since the plurality of batteries Ba1 and Ba2 are arranged and coupled in the axial direction of these batteries. This lowers the bending strength between the batteries Ba1 and Ba2, lacking in strength when undergoing an impact sideways with respect to the axial direction of the batteries in particular. Besides, when connecting each adjoining pair of batteries Ba1 and Ba2, the projection welding must be performed in an unstable position such that the projections 50c of the connector 50 are in contact with the outside of a battery case 53 of cylindrical shape, which lowers the welding yield. This also makes it difficult to secure a sufficient strength, and the productivity deteriorates due to the large number of times of welding.

Moreover, the cell-to-cell connection structure of FIG. 8 can only establish a series connection between batteries Ba1 and Ba2 that are arranged in the axial direction of the batteries. When connecting a required number of batteries to make a battery module or a battery pack, it is therefore necessary to use connecting members other than the connector 50 when juxtaposing battery rows formed by connecting certain numbers of batteries in series and connecting two batteries adjoining in respective radial directions at the ends of these battery rows. The cell-to-cell connection structure of FIG. 9, on the other hand, can only establish a series connection in a juxtaposed situation where a plurality of batteries are arranged with their respective battery axes in parallel with each other. When connecting batteries arranged in the axial direction of the batteries in series, it is therefore necessary, for example, to use such a connecting member as shown in FIG. 8.

As above, the conventional cell-to-cell connection structures require two types of connecting members having different shapes corresponding to a series arrangement in the axial direction and a juxtaposed arrangement in the radial directions of the batteries respectively. Since two types of connecting members are necessary for constituting a battery module or battery pack, the part cost including that of dies increases and the manufacturing cost becomes high. This makes the fabricated battery module or battery pack expensive. Besides, in both the cell-to-cell connection structures, two adjoining batteries are connected by welding a connecting member. Consequently, if any of the batteries in a battery module are found to be exhausted or degraded at the time of maintenance of the battery module, the entire battery module must be replaced, which pushes up the running cost.

By the way, large-sized cylindrical batteries such as a nickel metal-hydride battery having a large capacity of around 100 Ah and a weight of around 1.6 kg are expected to be put to practical use in the near future. Assuming that a battery module or battery pack is made of large-sized cylindrical batteries like this by using the cell-to-cell connection structure of FIG. 8 or 9, the relatively complicated configuration of these cell-to-cell connection structures makes the welding process difficult and the connecting members large in weight. It is also difficult to secure a sufficient strength against an impact, and thus the actual use is conceived to be extremely difficult.

The present invention has been achieved in view of the foregoing conventional problems, and it is thus an object thereof to provide a cell-to-cell connection structure which can connect each adjoining two of a plurality of cylindrical batteries both in an axial series arrangement and in a radial juxtaposed arrangement by using identical cell-to-cell connection plates for a reduction in cost, can achieve a structure for connecting even large-sized cylindrical batteries with sufficient robustness and weight saving, and allows easy disassembly as well.

Means for Solving the Problems

To achieve the foregoing object, a cell-to-cell connection structure according to the invention comprises a plurality of cylindrical batteries each having a battery case of closed-bottomed cylindrical shape with a bottom thereof serving as one electrode terminal and a sealing body arranged on an open-end side of the battery case serving as the other electrode terminal, the cylindrical batteries being axially arranged in series or radially juxtaposed so that opposite electrode terminals of each adjoining two of the cylindrical batteries are electrically and mechanically connected to each other, the structure comprising cell-to-cell connection plates each integrally having a welding part shaped to fall within a circular end of the battery case and a connecting part extending from this welding part, and wherein: the cell-to-cell connection plates are attached to the one electrode terminal and the other electrode terminal of the battery case by welding the welding parts, respectively; and the connecting parts of the respective cell-to-cell connection plates attached to each adjoining pair of cylindrical batteries are overlapped with each other and coupled into electrically connection.

According to this configuration, the welding parts of the cell-to-cell connection plates have such a shape as falls within the circular end of a battery case. The welding parts can thus be attached by welding to any of the electrode terminals at the respective ends of the battery case in the axial direction of the cell. In this attached state, the connecting parts of the cell-to-cell connection plates protrude sideways from the cylindrical battery. Consequently, when arranging two cylindrical batteries along the axial direction of the batteries, the connecting parts of the respective cell-to-cell connection plates attached to these batteries are overlapped and coupled with each other in a relative arrangement toward the same direction. This can connect the two adjoining batteries in series. On the other hand, when arranging two cylindrical batteries so that their battery axes are in parallel with each other, the connecting parts of the respective cell-to-cell connection plates attached to these batteries are overlapped and coupled with each other in mutually opposite directions. This can connect the two adjoining batteries in series. As above, the same cell-to-cell connection plates can be used to connect each pair of batteries regardless of where the plurality of cylindrical batteries are axially arranged in series or radially juxtaposed. This can reduce both the part cost and the manufacturing cost, making it possible to fabricate a battery module or a battery pack at low price.

In addition, the connecting parts are overlapped and coupled with each other beside the cylindrical batteries. Coupling means other than welding, such as fastening means consisting of a bolt and a nut, can thus be adopted to eliminate a welding process intended for cell-to-cell connection and thereby simplify the manufacturing processes even when connecting large-sized cylindrical batteries. The simplified configuration provides a highly robust structure capable of securing strength against an impact without increasing the weight of the connecting areas. Besides, if some of the batteries are found to be exhausted or degraded on such occasions as maintenance time, the coupling between two overlapped connecting parts can be released to replace necessary batteries alone. Moreover, the cell-to-cell connection plates have a simple plate-like form and are attached so that their connecting parts protrude sideways from the cylindrical batteries. This creates an air-passable gap between two cylindrical batteries connected to each other, thereby proving a sufficient heat dissipation effect regardless of whether the plurality of cylindrical batteries are connected in an axial series arrangement or in a radial juxtaposed arrangement.

In the foregoing cell-to-cell connection structure, the cell-to-cell connection plate may have a step part along a border between the welding part and the connecting part, and the welding part may be formed in a recessed shape from the connecting part. According to this configuration, the welding parts of the cell-to-cell connection plates can always be attached with high joint strength since they can be held stably during welding so as to fit into a recess formed by a caulked portion of the battery case and the outer surface of the sealing plate.

In the foregoing cell-to-cell connection structure, a caulked portion on the open-end side of the battery case may be covered with an insulating ring, and the step part of the cell-to-cell connection plate may be formed so that its outer side next to the connecting part has a semicircular shape with a radius of curvature generally coincident with an inner periphery of the insulating ring, and has a height greater than a difference in level between an axial end of the caulked portion and the outer surface of the sealing plate. According to this configuration, the welding part of the cell-to-cell connection plate can be securely welded to the outer surface of the sealing plate while the outer side of the step part of the cell-to-cell connection plate is held stably as positioned so as to fit into and make contact with the inner periphery of the insulating ring. This makes it possible to create a joint state of high robustness capable of obtaining a high welding strength all the time without variations. Moreover, when the cell-to-cell connection plates are attached to the batteries, the axial end of the caulked portion and the connecting part create a gap therebetween, with the advantage of improved heat dissipation characteristic. The presence of the insulating ring also prevents the cell-to-cell connection plates from causing an electric short circuit between the battery case and the sealing plate which make one and the other electrodes, respectively.

Furthermore, in the foregoing cell-to-cell connection structure, the cell-to-cell connection plates of identical shape may be attached to both the one and the other electrode terminals of the battery case. According to this configuration, it is possible to cope with both a series connection of two cylindrical batteries arranged in the axial direction of the batteries and a series connection of two cylindrical batteries juxtaposed in a radial direction by using the cell-to-cell connection plates of identical shape alone. A battery module or a battery pack can thus be fabricated at low price easily.

Moreover, in the foregoing cell-to-cell connection structure, a pair of the cell-to-cell connection plates to be connected to the respective electrode terminals of each cylindrical battery may be connected in a relative arrangement such that protruding directions of the respective connecting parts from the cylindrical battery form an arbitrary angle. According to this configuration, the pair of cell-to-cell connection plates attached to the respective ends of each cylindrical battery is adjusted into such a relative arrangement that their connecting parts form an arbitrary angle. This makes it easily possible to cope with both a series connection of a plurality of cylindrical batteries arranged in the axial direction of the batteries and a series connection in a radially juxtaposed arrangement, thereby constituting a battery module having a plurality of cylindrical batteries connected in a desired arrangement. In addition, when fabricating a battery module, it is possible to cope with various modes of arrangement including one in which a plurality of cylindrical batteries are stacked in a close-packed arrangement, for example.

Furthermore, in the foregoing cell-to-cell connection structure, the connecting part of the cell-to-cell connection plate may be formed in a shape that is bordered with two lateral sides which extend from the welding part in parallel with each other at a distance greater than a diameter of the welding part of semicircular shape and smaller than a diameter of the battery case, and an end side which is orthogonal to these lateral sides. According to this configuration, the connecting part of the cell-to-cell connection plate protrudes only in their own longitudinal directions, not projecting in width directions. This makes it possible to couple two connecting parts to each other at a position within the diameter of the battery cases, and a large number of cylindrical batteries can be stacked in a plurality of rows with a stable arrangement easily, thereby constituting a battery module or a battery pack easily.

Moreover, in this cell-to-cell connection structure, a pair of coupling holes may be formed in both end side areas near the lateral sides of the connecting part of the cell-to-cell connection plate. According to this configuration, two adjoining cell-to-cell connection plates can be coupled to each other by mating these coupling holes, and each adjoining pair of cylindrical batteries can be connected to each other without welding. In addition, slight variations in the relative positions of the adjoining cylindrical batteries can be absorbed by the coupling holes. This provides flexibility when positioning the cylindrical batteries to each other and thus facilitates position adjustment when the cylindrical batteries are arranged along the axial direction or juxtaposed in the radial direction of the batteries.

Moreover, in this cell-to-cell connection structure, the two adjoining cell-to-cell connection plates may be electrically connected by overlapping their respective connecting parts with each other in a relative position where these coupling holes are mated, and threadedly fastening bolts and nuts through the mated coupling holes. According to this configuration, since the two adjoining cell-to-cell connection plates can be coupled to each other by mating these coupling holes and fastening the bolts and the nuts, it is possible to omit a welding process when connecting the two cylindrical batteries to each other. Besides, when some of the cylindrical batteries in a battery module or a battery pack are found to be exhausted or degraded on such occasions as maintenance time, the bolts can be unscrewed to replace necessary cylindrical batteries alone. This allows a significant reduction in the running cost as compared to conventional cases of replacement in units of a battery module.

Furthermore, in this cell-to-cell connection structure, the nuts may be welded to either one of the mutually overlapped connecting parts of the two adjoining cell-to-cell connection plates, in a layout coincident with the coupling holes. According to this configuration, two adjoining cylindrical batteries can be connected simply by mating the coupling holes of the cell-to-cell connection plates welded to the two respective cylindrical batteries, and inserting bolts through these mated coupling holes and threadedly fastening the same to the nuts. This improves connection workability significantly.

Moreover, in the foregoing cell-to-cell connection structure, the bolts and the nuts may be made of brass. According to this configuration, the bolts and the nuts become low in electric resistance for a further increase in output.

Furthermore in the foregoing cell-to-cell connection structure, a slit may be formed in the connecting part of the cell-to-cell connection plate at a location between the pair of coupling holes. According to this configuration, when coupling two adjoining cell-to-cell connection plates by fastening the bolts and the nuts, the presence of the slits allows easy deformation to absorb distortions that occur in the cell-to-cell electrode plates when the welding parts are welded to the cylindrical batteries. This makes it possible to perform reliable fastening. Meanwhile, when coupling two adjoining cell-to-cell connection plates by welding, the slits function to reduce invalid currents during welding. The presence of the slits also allows easy deformation to absorb distortions of the two cell-to-cell connection plates. It is therefore possible to perform reliable welding.

Moreover, in the foregoing cell-to-cell connection structure, the welding part of the cell-to-cell connection plate may have a plurality of projections intended for welding to the electrode terminal of the cylindrical battery, and a slit may be formed between adjoining two of the foregoing projections. According to this configuration, when the welding parts of the cell-to-cell connection plates are welded through the projections, the slits can reduce invalid currents during welding. The presence of the slits also allows easy deformation to absorb distortions of both the welding parts and the battery cases. It is therefore possible to perform reliable projection welding with high joint strength.

Moreover, in the foregoing cell-to-cell connection structure, the cell-to-cell connection plate may be made of iron, copper, or brass surface-treated with nickel at least one side, or any one of nickel, iron, copper and brass. According to this configuration, the cell-to-cell connection plate has low electric resistance, and can thus increase the output of a battery module or battery pack fabricated.

Moreover, in the foregoing cell-to-cell connection structure, the two adjoining cell-to-cell connection plates may be coated with an insulating paint after coupled to each other. According to this configuration, the outer surfaces of the cell-to-cell connection plates are electrically insulated for even higher safety.

Furthermore, in the foregoing cell-to-cell connection structure, an far infrared paint may be used as the insulating paint. In addition to the effect of insulating the cell-to-cell connection plates, this configuration also provides the cell-to-cell connection plates with a heat dissipation effect so that they function like heat radiation fins.

BEST MODE FOR CARRYING OUT THE INVENTION

Figure 1:
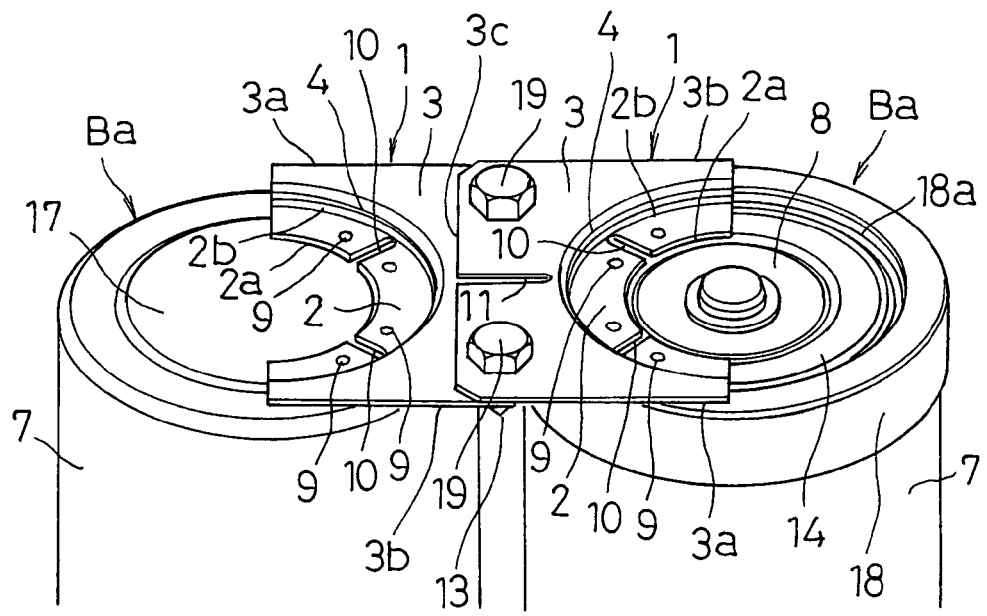
FIG. 1 is a perspective view showing the connection configuration of a cell-to-cell connection structure according to an embodiment of the present invention.
Figure 2:
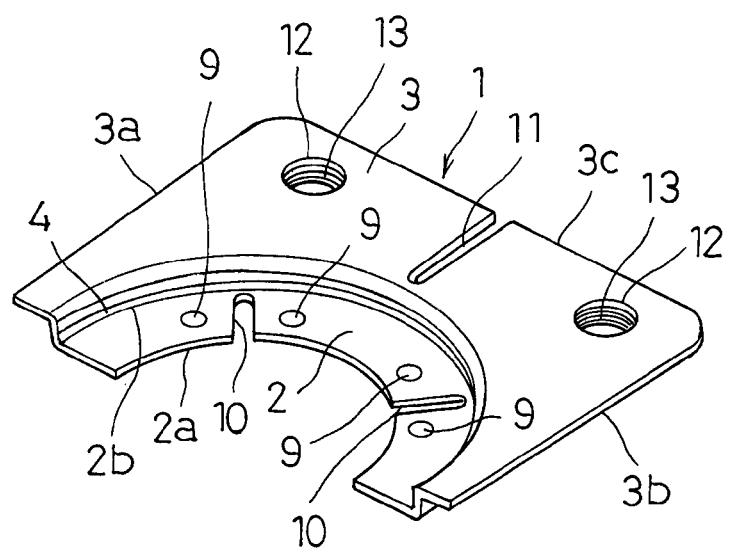
FIG. 2 is a perspective view showing a cell-to-cell connection plate to be used for the foregoing connection structure.

Hereinafter, best mode for carrying out the present invention will be described in detail with reference to the drawings. FIG. 1 is a perspective view showing the connection configuration of a cell-to-cell connection structure according to an embodiment of the present invention. FIG. 2 is a perspective view showing a cell-to-cell connection plate 1 to be used for that connection. Initially, a description will be given of the cell-to-cell connection plate 1 of FIG. 2. This cell-to-cell connection plate 1 is shaped so that a welding part 2 to be attached to a battery case 7 by welding means and a connecting part 3 extending from this welding part 2 are integrally joined via a step part 4 so that the welding part 2 is recessed from the connecting part 3.

The welding part 2 mentioned above has a semicircular shape such as falls within a circular end of the battery case 7 of the battery Ba shown in FIG. 1. Specifically, it has a semicircular shape bordered with an inner peripheral portion 2a of semicircular shape having a radius of curvature slightly greater than that of the circumferential end face of a circular electrode terminal plate 8 (FIG. 1) of the battery Ba, and an outer peripheral portion 2b of semicircular shape having a radius of curvature corresponding to the inner periphery of a circular caulked portion on the open-end side of the battery case 7. This welding part 2 has a plurality (four, in this embodiment) projections 9 intended for resistance welding, and slits 10 are formed between respective pairs of adjoining projections 9.

The connecting part 3 mentioned above is formed in a generally rectangular shape with a pair of lateral sides 3a and 3b, and an end side 3c orthogonal to this lateral side 3a. The pair of lateral sides 3a and 3b are extended from the welding part 2 in parallel with each other at a distance greater than the diameter of the welding part 2 of semicircular shape and slightly smaller than the diameter of the battery case 7. This connecting part 3 has a slit 11 which extends from the center of the end side 3c in parallel with both the lateral sides 3a and 3b. Besides, a pair of coupling holes 12 are formed in locations near both ends of the end side 3c. It should be appreciated that the connecting part 3 is sometimes provided with a pair of nuts 13 which are positioned to the coupling holes 12 and attached by welding to the underside of the cell-to-cell connection plate 2 shown in FIG. 2 in advance.

The step part 4 mentioned above is erected from the semicircular outer peripheral portion 2b of the welding part 2, and has a semicircular shape when seen in a plan view. Its outer side next to the connecting part 3 is formed in a semicircular shape with a radius of curvature coincident with the inner periphery of the caulked portion at the open-end of the battery case 7, and has a height slightly greater than the distance from a sealing plate 14 of the battery Ba to the axial end of the caulked portion. This cell-to-cell connection plate 1 having the shape that the welding part 2 and the connecting part 3 are integrally joined via the step part 4 is integrally made of iron, copper, brass, or other materials surface-treated with nickel at least on one side, or such materials as nickel, iron, copper, and brass. It thus has a low electric resistance for increasing in output.

Next, the cell-to-cell connection structure using the foregoing cell-to-cell connection plate 1 will be described with reference to FIG. 1. It should be noted that FIG. 1 shows an example where an insulating ring 18 is attached to cover the caulked portion on the open-end side of a battery case 7. This will be detailed later. Since the welding part 2 has the semicircular shape that falls within the circular end face of the battery case 7, the cell-to-cell connection plate 1 described above can be attached commonly to both the sealing plate 14 having an electrode terminal plate 8, as a positive electrode terminal, of the battery Ba joined thereto, and a bottom 17 of the battery case 7 as a negative electrode terminal.

When attaching the cell-to-cell plate 1 to the sealing plate 14 of a battery Ba by welding the welding part 2, the welding part 2 is initially placed on the sealing plate 14 of the battery Ba and the outer side of the step part 4 is put against an inner periphery 18a of the insulating ring 18. Since the outer side of the step part 4 is formed in a semicircular shape having a radius of curvature generally coincident with the inner periphery 18a of the insulating ring 18, the outer side of the step part 4 is positioned in close contact with the inner periphery 18a of the insulating ring 18 so that it generally fits into the same. It is therefore possible to hold the cell-to-cell connection plate 1 stably while welding the welding part 2 to the sealing plate 14. This always secures a high welding strength between the welding part 2 and the sealing plate 14 welded to each other without variations, thereby creating a joint state of high robustness.

During the foregoing welding, a pair of welding electrodes is put into contact with each of locations of the welding part 2 corresponding to the projections 9 for projection welding. Since the contact areas are small, a welding current concentrates and locally flows through the contact portions with high contact resistance between the projections 9 and the sealing plate 14. The resulting heat melts the projections 9, thereby joining the welding part 2 and the sealing plate 14 mutually. Here, the slits 10 of the welding part 2 reduce invalid currents during the projection welding. The presence of the slits 10 also allows easy deformation to absorb distortions of both the sealing plate 14 and the welding part 2. The welding can thus be performed with reliability.

When attaching the cell-to-cell connection plate 1 to the bottom 17 of the battery case 7 of a battery Ba by welding, on the other hand, the welding part 2 is put against the bottom 17 of the battery case 7 of the battery Ba, and a pair of welding electrodes are put into contact with each of locations of the welding part 2 corresponding to the projections 9 for projection welding. Since the contact areas are small, a welding current concentrates and locally flows through the contact portions of high contact resistance between the projections 9 and the bottom 17. The resulting heat melts the projections 9, thereby joining the welding part 2 and the bottom 17 mutually. Here, the slits 10 of the welding part 2 reduce invalid currents during the projection welding. The presence of the slits 10 also allows easy deformation to absorb distortions of both the welding part 2 and the bottom 17. The welding can thus be performed with reliability.

Then, as shown in FIG. 1, when juxtaposing two batteries Ba and electrically connecting these in series in a radial direction, the connecting parts 3 of two cell-to-cell connection plates 1 extending sideways from the open-end side and the bottom 17 of the respective battery cases 7 are overlapped in mutually opposite directions, and positioned to a relative arrangement such that the respective pairs of coupling holes 12 coincide with each other. Bolts 19 inserted through the respective overlapped pairs of coupling holes 12 from one side are threadedly fastened to the nuts 13 on the other side, whereby the two cell-to-cell connection plates 1 are mutually coupled into electric connection. Slight variations in the relative positions of the two adjoining cylindrical batteries Ba can be absorbed by the coupling holes 12 when positioning the pair of cell-to-cell connection plates 1. This provides flexibility when positioning the cylindrical batteries Ba to each other and thus facilitates position adjustment when the cylindrical batteries Ba are arranged along the axial direction or juxtaposed in the radial direction of the batteries. Moreover, when connecting the pair of cell-to-cell connection plates 1 by threadedly fastening the bolts 19 and the nuts 13, the presence of the slits 11 allows easy deformation to absorb distortions of the respective cell-to-cell connection plates 1. This makes it possible to perform reliable screwing and fastening.

While one of the features of this cell-to-cell connection structure consists in that an identical cell-to-cell connection plate 1 can be attached commonly to both the open-end side and the bottom 17 of the battery case 7, the nuts 13 may previously be attached to one side of the cell-to-cell connection plate 1 that is intended for the bottom 17 of the battery case 7. This can facilitate and accelerate the foregoing coupling operation further.

In the foregoing configuration that the two cell-to-cell connection plates 1 are coupled by such fastening means as bolts 19 and nuts 13, it is possible to omit a welding process when making the cell-to-cell connection structure. Besides, if some of the cylindrical batteries Ba are found to be exhausted or degraded on such occasions as the time of maintenance of the battery module or battery pack that is constituted by using this cell-to-cell connection structure, then the bolts 19 can be unscrewed to replace necessary cylindrical batteries Ba alone. As compared to conventional cases of replacement in units of a battery module or a battery pack, there is a great advantage since the running cost can be reduced significantly. It should be appreciated that the two adjoining cell-to-cell connection plates 1 may be fixed and coupled to each other by welding instead of the foregoing coupling means of threadedly fastening using the bolts 19 and the nuts 13. In this instance, the slits 11 function to reduce invalid currents during the welding, and the presence of the slits 11 themselves allows easy deformation to absorb distortions of the two cell-to-cell connection plate 1. The welding can thus be performed with reliability.

Figure 3:
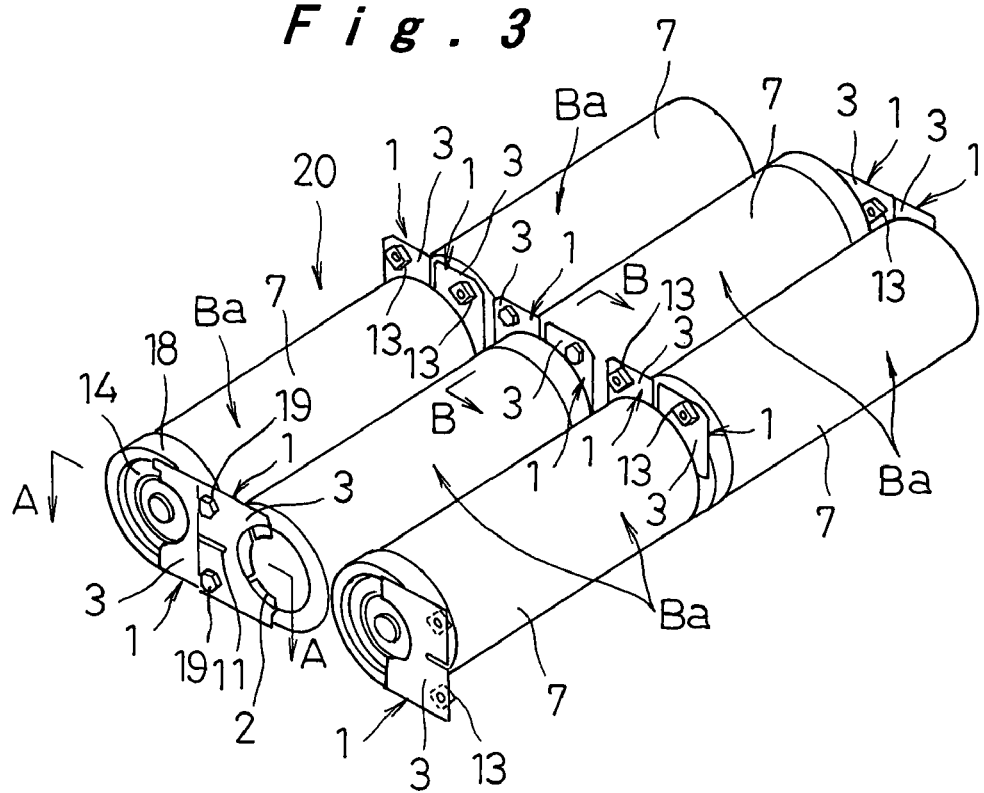
FIG. 3 is a perspective view showing a battery module constituted by using the foregoing cell-to-cell connection structure.
Figure 4:
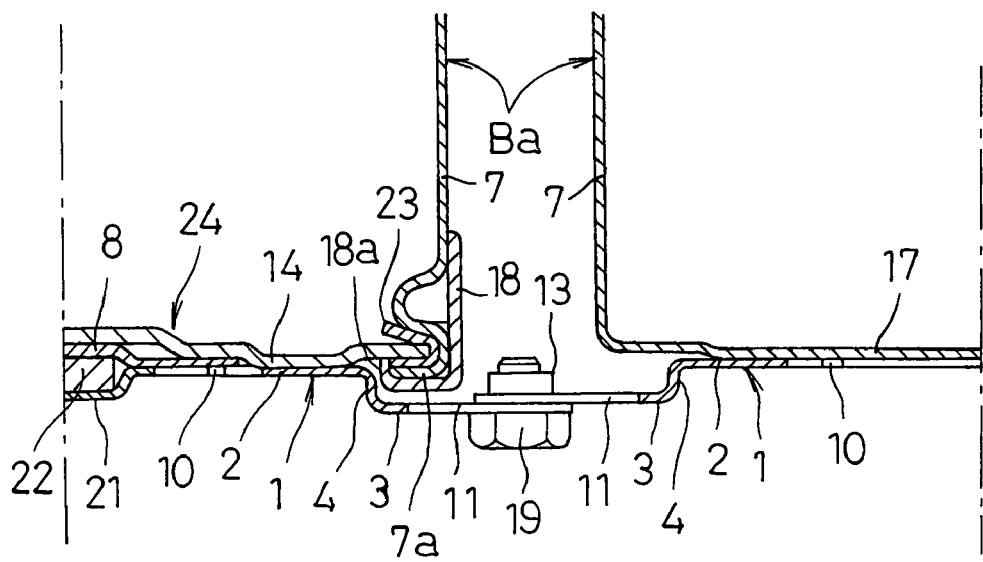
FIG. 4 is an enlarged sectional view taken along line IV-IV of FIG. 3.
Figure 5:
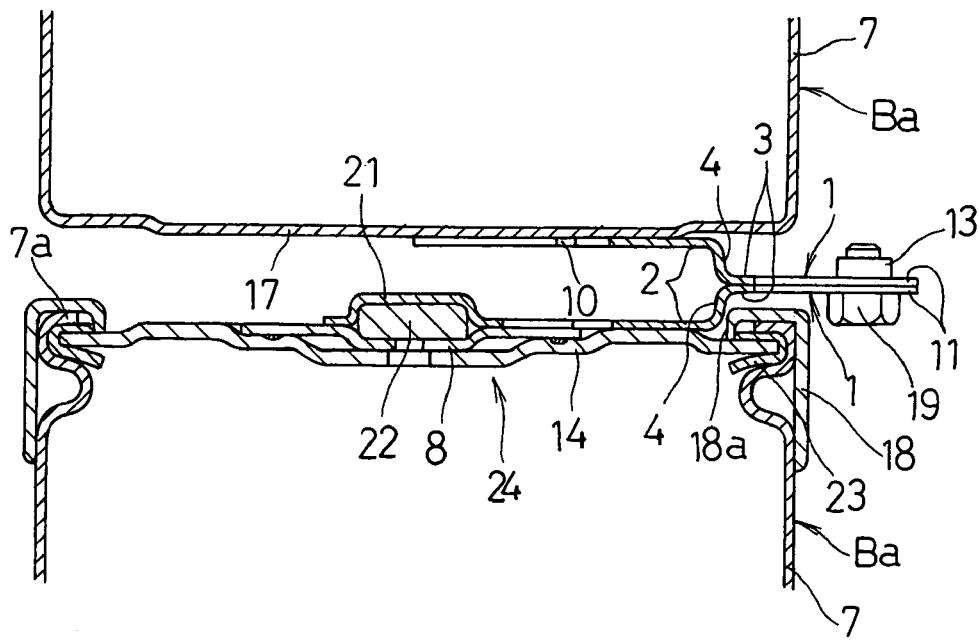
FIG. 5 is an enlarged sectional view taken along line V-V of FIG. 3.

FIG. 3 shows a battery module 20 having six cylindrical batteries Ba that are electrically connected in series by using the cell-to-cell connection structure according to the present invention. FIGS. 4 and 5 are enlarged sectional views taken along line IV-IV and line V-V of FIG. 3, respectively. FIG. 4 shows a part of the cell-to-cell connection structure formed by establishing an electric series connection between two cylindrical batteries Ba adjoining in a juxtaposed arrangement in the radial direction of the battery module 20 as in FIG. 1. Through the connection process described in FIG. 1, it is configured so that opposite electrodes of the two respective cylindrical batteries Ba are electrically connected to each other via the mutual coupling of two identical cell-to-cell connection plates 1.

In this embodiment, the cylindrical batteries Ba to be connected by this cell-to-cell connection structure are large-sized nickel metal-hydride batteries with high capacity. As shown in FIG. 4, these cylindrical batteries Ba have a battery case 7 of closed-bottomed cylindrical shape which functions as a negative electrode and has an open-end in one end, which is sealed by: a sealing plate 14; an electrode terminal plate 8 joined to the outer surface of this sealing plate 14; a U-sectioned cap-like positive electrode terminal 21 fixed to the center of this electrode terminal plate 8; a rubber vent plug 22 arranged in the space between this cap-like positive electrode terminal 21 and the electrode terminal plate 8; and an insulating gasket 23. The peripheral area of the sealing plate 14 and the open-end of the battery case 7 are fixed airtightly to each other via the insulating gasket 23 compressed by a caulked portion 7a, the caulked portion 7a being formed by applying a caulking process of bending the open-end of the battery case 7 inward with the insulating gasket 23 therebetween.

FIG. 5 shows a part of the cell-to-cell connection structure formed by establishing a series connection between two cylindrical batteries Ba adjoining in a series arrangement in the axial direction of the battery module 20. In this cell-to-cell connection structure, the two identical cell-to-cell connection plates 1 attached by welding the welding parts 2 to the sealing plate 14 and the bottom 17 of the respective battery cases 7 through the connection process described in FIG. 1 are overlapped with each other in an arrangement toward the same direction, at such relative positions that their respective pairs of coupling holes 12 coincide with each other. Bolts 19 inserted through the respective mutually-overlapping pairs of coupling holes 12 from one side are threadedly fastened with nuts 13 on the other side, whereby the two cell-to-cell connection plates 1 are mutually coupled into electric connection. Even at this coupling time, the presence of the slits 11 allows easy deformation to absorb distortions of the respective cell-to-cell connection plates 1 as with the cell-to-cell connection structure of FIG. 4. It is therefore possible to fasten the bolts 19 and the nuts 13 with reliability.

The cell-to-cell connection structures shown in FIGS. 4 and 5, respectively, provide the following significant effect. That is, in these cell-to-cell connection structures, the cell-to-cell connection plates 1 which connect two adjoining cylindrical batteries Ba to each other can be attached by welding their welding parts 2 of semicircular shape falling within the circular end face of a battery case Ba to either of the negative electrode terminal, which consists of the flat bottom 17 of the battery case Ba, and the positive electrode terminal, which consists of the cap-like positive electrode terminal 21 protruded from the electrode terminal plate 8. In this attached state, the connecting parts 3 of the cell-to-cell connection plates 1 protrude sideways from the cylindrical batteries Ba.

Consequently, as shown in FIG. 5, two adjoining cylindrical batteries Ba arranged in the axial direction of the batteries can be connected in series by overlapping and coupling the two cell-to-cell connection plates 1 attached to the two cylindrical batteries Ba that are arranged so that their respective connecting parts 3 are in an identical direction. In the meantime, as shown in FIG. 4, two cylindrical batteries Ba juxtaposed in the radial direction can be connected in series by overlapping and coupling the connecting parts 3 so that the two cell-to-cell connection plates 1 are arranged in mutually opposite directions. As above, regardless of whether a plurality of cylindrical batteries Ba are arranged in series in the axial direction or juxtaposed in the radial direction of the batteries, the adjoining two can be connected to each other by using identical cell-to-cell connection plates 1. This can reduce both the part cost and the manufacturing cost, thereby making it possible to fabricate a battery module 20 or a battery pack having a plurality of such battery modules 20 in cascade at extremely low price.

Moreover, the cell-to-cell connection plates 1 have a simple plate-like shape and are attached so that their connecting parts 3 protrude sideways from the cylindrical batteries Ba. This creates an air-passable gap between the two cylindrical batteries Ba connected to each other, thereby proving a sufficient heat dissipation effect. In addition, since the connecting parts 3 are coupled to each other beside the cylindrical batteries Ba, it is possible to adopt fastening means including the bolts 19 and the nuts 13, not-shown rivet caulking means, and the like aside from welding. Consequently, even in the cases of connecting large-sized cylindrical batteries, it is possible to eliminate the welding process for easy connection. Since the simplified configuration precludes an increase in the weight of the connection areas, and the welding parts 2 of semicircular shape and the battery cases 7 are joined across a wide area, it is possible to provide high robustness capable of securing a sufficient strength against an impact.

Furthermore, the welding part 2 of a cell-to-cell connection plate 1 can be welded to the sealing plate 14 in a stably-held state that the welding part 2 fits into the recess formed by the caulked portion 7a of the battery case 7 and the outer surface of the sealing plate 14, and the outer side of the step part 4 also fits into contact with the inner periphery 18a of the insulating ring 18 for positioning. It is therefore possible to weld the welding part 2 to the outer surface of the sealing plate 14 with reliability, so that high welding strength is always secured without variations, thereby creating a joint state of high robustness. Moreover, when a cell-to-cell connection plate 1 is attached to the positive-electrode-terminal side of a cylindrical battery, there is the advantage of improved heat dissipation characteristics since the axial end of the caulked portion 7a of the battery case 7 and the connecting part 3 form a gap therebetween as clearly shown in FIGS. 4 and 5. The presence of the insulating ring 18 precludes the cell-to-cell connection plate 1 from causing an electric short circuit between the battery case 7 and the sealing plate 14.

Moreover, as described in FIG. 2, the connecting parts 3 of the cell-to-cell connection plates 1 are formed in a generally rectangular shape bordered with the two lateral sides 3a and 3b which are extended from the welding part 2 in parallel with each other at a distance greater than the diameter of the welding part 2 of semicircular shape and smaller than the diameter of the battery cases 7, and the end side 3c which is orthogonal to these two lateral sides 3a and 3b. These connecting parts 3 therefore protrude from the cylindrical batteries Ba only in their own longitudinal directions, not projecting in width directions. This makes it possible to couple two connecting parts 3 to each other at a position within the diameter of the battery cases 7. As will be described later, a large number of cylindrical batteries Ba can be stacked in a plurality of rows with a stable arrangement easily, thereby constituting a battery module 20 or a battery pack easily.

Furthermore, the cell-to-cell connection plate 1 is made of iron, copper, brass, or other materials surface-treated with nickel at least one side, or such materials as nickel, iron, copper and brass, and thus have a low electric resistance. In the meantime, the bolts 19 and the nuts 13 for coupling the cell-to-cell connection plates 1 to each other are preferably made of brass. When using the bolts 19 and nuts 13 of brass, cell-to-cell connection plates 1 of copper can be used to best match for lowering extremely battery resistance. These can thus be used to constitute a battery module 20 or battery pack with even higher output.

In the foregoing embodiment, after the two cylindrical batteries Ba are connected to each other by threadedly fastening the bolts 19 and the nuts 13, the cell-to-cell connection plates 1 are coated by application of an far infrared paint. This electrically insulates the cell-to-cell connection plates 1 for higher safety, and provides the cell-to-cell connection plates 1 with an effect of heat dissipation so that they function like heat radiation fins.

Figure 7:
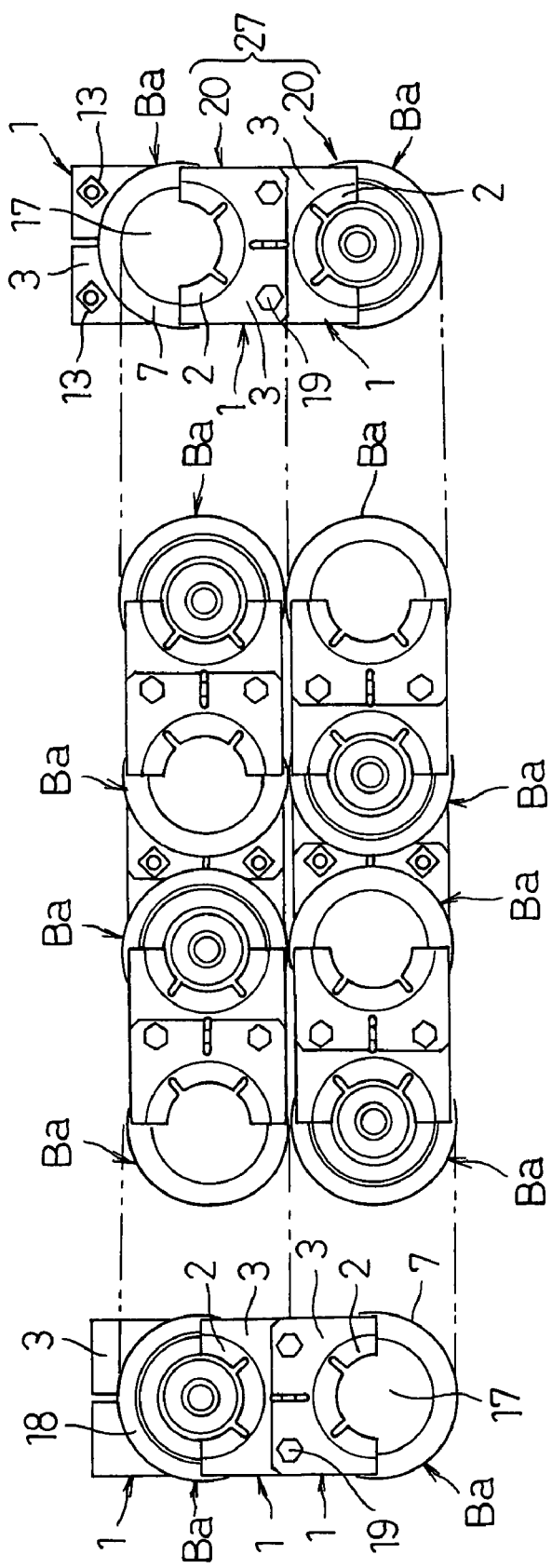
FIG. 7 is a side view showing a part of another battery pack constituted by using the foregoing cell-to-cell connection structure.
Figure 8:
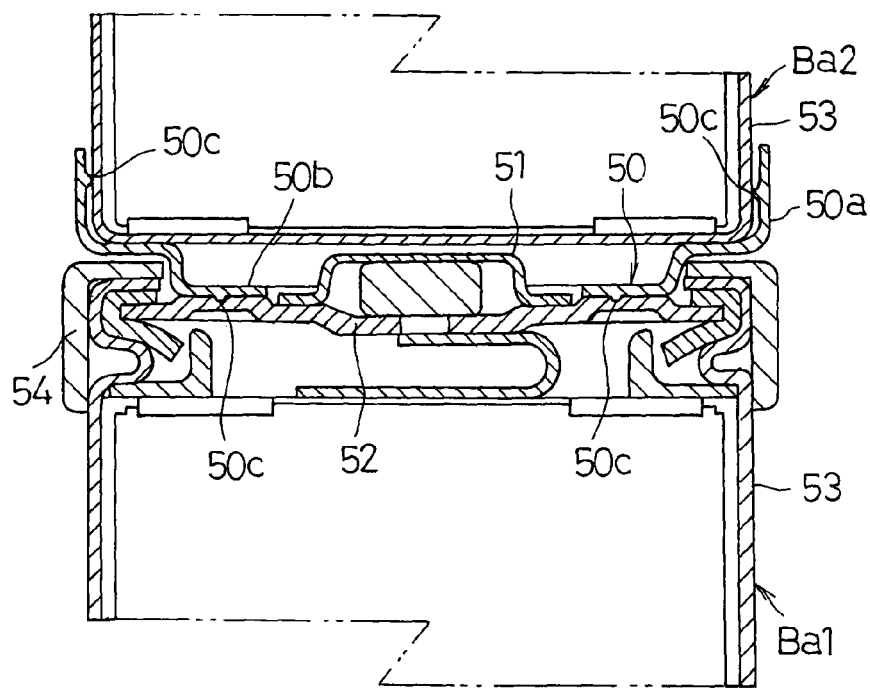
FIG. 8 is a longitudinal sectional view showing a conventional cell-to-cell connection structure.
Figure 9:
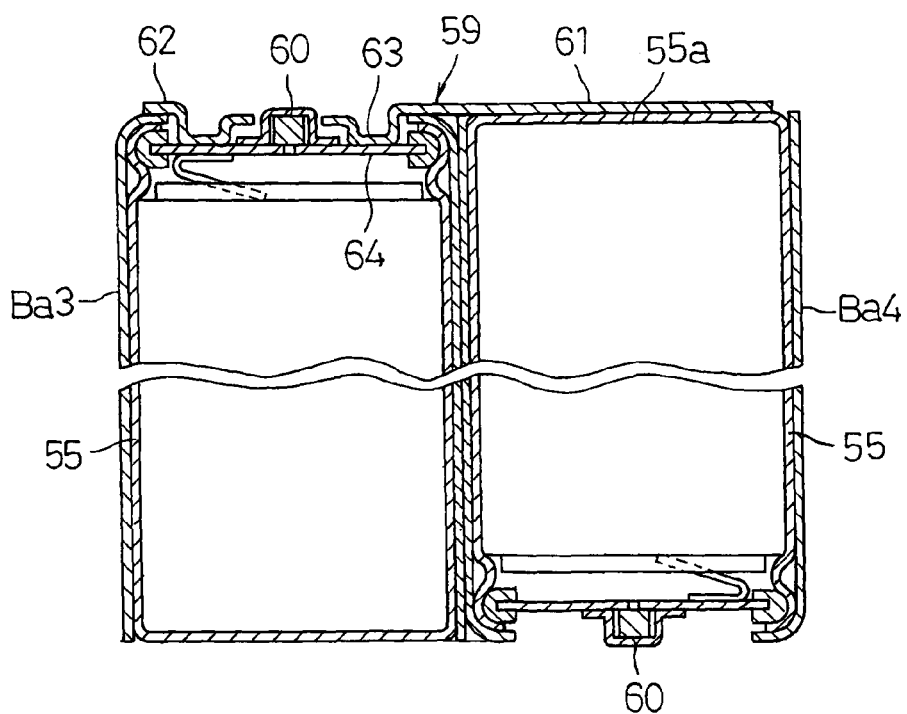
FIG. 9 is a longitudinal sectional view showing another conventional cell-to-cell connection structure.

FIG. 7 shows a battery pack 27 which is constituted by using the cell-to-cell connection structure according to the embodiment. This battery pack 27 uses two battery modules 20 having almost the same configuration as in FIG. 3, and is formed by connecting the individual cylindrical batteries Ba in series while these two battery modules 20 are stacked in two layers in a mutually-opposed arrangement. This battery pack 27 can be formed by using cell-to-cell connection plates 1 that are applicable to both a series connection of two cylindrical batteries Ba adjoining in an axial series arrangement and a series connection of two cylindrical batteries Ba adjoining in a radial juxtaposed arrangement. Since all the cylindrical batteries Ba can be connected by using a single type of cell-to-cell connection plates 1, it is possible to achieve a significant reduction in cost.

When forming the battery module 20 of FIG. 3, each pair of cell-to-cell connection plates 1 to be attached to both ends of a cylindrical battery Ba, respectively, are attached to the cylindrical battery Ba in a relative position such that the directions of protrusion of their respective connecting parts 3 form an angle of 90°. In the meantime, when forming the battery packs 27 of FIG. 7, each pair of cell-to-cell connection plates 1 to be attached to both ends of a cylindrical battery Ba, respectively, are attached to the cylindrical battery Ba in a relative position such that the directions of protrusion of their respective connecting parts 3 form an angle of 180°, aside from the relative position such that the directions of protrusion of their respective connecting parts 3 form an angle of 90° as in FIG. 3.

Figure 6:
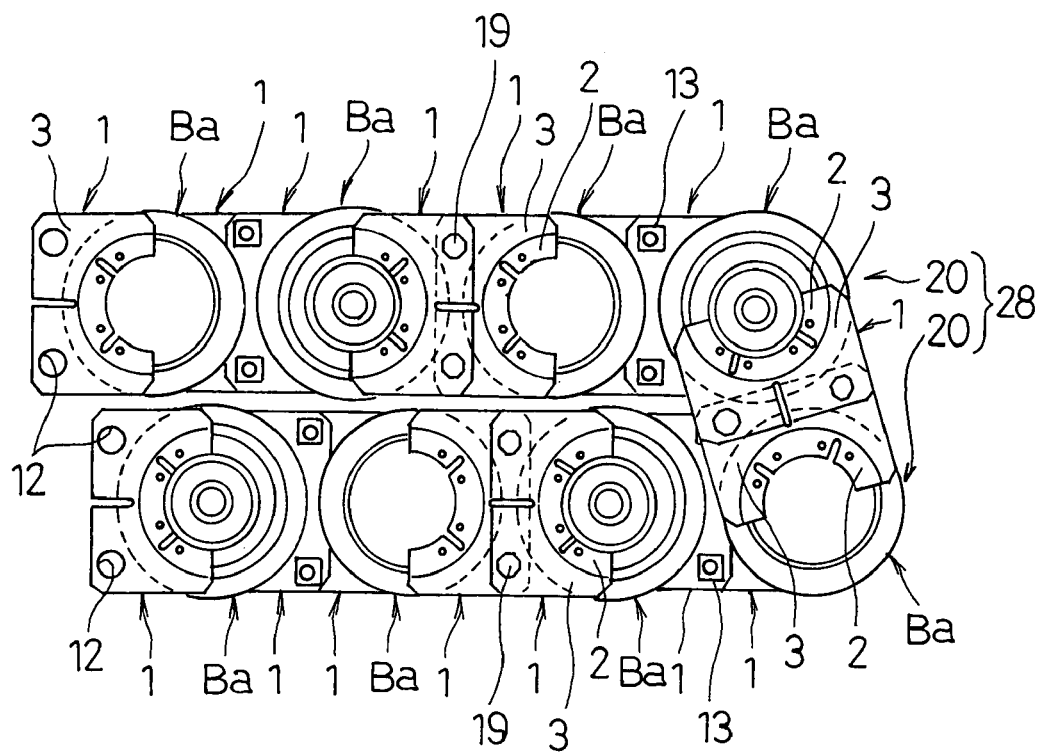
FIG. 6 is a side view showing a battery pack constituted by using the foregoing cell-to-cell connection structure.

Now, FIG. 6 shows a part of another battery pack 28 which is constituted by using the cell-to-cell connection structure according to the embodiment. As in FIG. 7, this battery pack 28 uses two battery modules 20 having almost the same configuration as in FIG. 3, and is formed by connecting the individual cylindrical batteries Ba in series while these two battery modules 20 are stacked in two layers. Nevertheless, the upper and lower battery modules 20 are shifted in position so that the cylindrical batteries Ba are stacked in a close-packed arrangement. In this battery pack 28, a pair of cell-to-cell connection plates 1 to be attached to both ends of the rightmost cylindrical battery Ba in the bottom battery module 20 are attached to the cylindrical battery Ba in a relative position such that the directions of protrusion of their respective connecting parts 3 form an angle of 60°. A pair of cellto-cell connection plates 1 to be attached to both ends of the rightmost cylindrical battery Ba in the top battery module 20 are attached to the cylindrical battery Ba in a relative position such that the directions of protrusion of their respective connecting parts 3 form an angle of 120°.

That is, while the cell-to-cell connection structure of the foregoing embodiment uses an identically-shaped, single type of cell-to-cell connection plates 1 alone, a pair of cell-to-cell connection plates 1 to be attached to both electrode terminals of each cylindrical battery Ba can be put in such a relative position that the directions of protrusion of their respective connecting parts 3 from the cylindrical battery Ba form an arbitrary angle. This brings a significant advantage that the cylindrical batteries Ba can be easily configured to various modes of arrangement such as a close-packed arrangement and a staggered arrangement when fabricating battery modules.

INDUSTRIAL APPLICABILITY

As has been described, according to the cell-to-cell connection structure of the present invention, it is possible to use the same cell-to-cell connection plates both for connecting two axially-arranged cylindrical batteries in series and for connecting two radially-juxtaposed cylindrical batteries in series. This can reduce the part cost and the manufacturing cost as well, thereby making it possible to fabricate a battery module or a battery pack at low price. In addition, two cylindrical batteries connected to each other create an air-passing gap therebetween for a sufficient heat dissipation effect. Furthermore, since two cell-to-cell connection plates can be coupled to each other by fastening means such as a bolt and a nut other than welding, it is possible to omit the welding process for easy connection even when connecting large-sized cylindrical batteries. The simplified configuration precludes an increase in the weight of the connecting portions, and the large joint area between the welding part of semicircular shape and the battery case can achieve high robustness capable of securing a sufficient strength against an impact.

The invention claimed is:

1. A cell-to-cell connection structure comprising: a plurality of cylindrical batteries each having a battery case of closed-bottomed cylindrical shape with a bottom thereof serving as a first electrode terminal and a sealing body arranged on an open-end side of the battery case, serving as a second electrode terminal, the cylindrical batteries being axially arranged in series or radially juxtaposed so that opposite electrode terminals of each adjoining two of the cylindrical batteries are electrically and mechanically connected to each other, the structure comprising cell-to-cell connection plates each integrally having a welding part shaped to fall within a circular end of the battery case and a connecting part extending from the welding part, and wherein:

the cell-to-cell connection plates are attached to the first electrode terminal and the second electrode terminal of the battery case by welding the welding parts, respectively; and the connecting parts of the respective cell-to-cell connection plates attached to each adjoining pair of cylindrical batteries are overlapped with each other and coupled to form an electrical connection.

2. The cell-to-cell connection structure according to claim 1, wherein the cell-to-cell connection plate has a step part along a border between the welding part and the connecting part, and the welding part is formed in a recessed shape from the connecting part.

3. The cell-to-cell connection structure according to claim 2, wherein a caulked portion on the open-end side of the battery case is covered with an insulating ring, and the step part of the cell-to-cell connection plate is formed so that its outer side next to the connecting part has a semicircular shape with a radius of curvature generally coincident with an inner periphery of the insulating ring, and has a height greater than a difference in level between an axial end of the caulked portion and the outer surface of a sealing plate.

4. The cell-to-cell connection structure according to claim 1, wherein the cell-to-cell connection plates include cell-to-cell connection plates having identical shape, the cell-to-cell connection plates having substantially identical shape being attached to both the first and second electrode terminals of the battery case.

5. The cell-to-cell connection structure according to claim 1, wherein a pair of the cell-to-cell connection plates connected to the first and second electrode terminals of corresponding cylindrical batteries are connected in a relative arrangement such that protruding directions of the respective connecting parts from the cylindrical batteries form an arbitrary angle.

6. The cell-to-cell connection structure according to claim 1, wherein the connecting parts of the cell-to-cell connection plates are each formed in a shape that is bordered with two lateral sides extending from the welding part in parallel with each other at a distance greater than a diameter of the welding part of semicircular shape and smaller than a diameter of the battery case, and an end side which is orthogonal to the two lateral sides.

7. The cell-to-cell connection structure according to claim 6, wherein a coupling hole is formed in each of the two lateral sides, each coupling hole being located at end corner of a corresponding lateral side.

8. The cell-to-cell connection structure according to claim 7, wherein two adjoining cell-to-cell connection plates are electrically connected by overlapping connecting parts of the two adjoining cell-to-cell connection plates with each other in a relative position where coupling holes of the connecting parts are mated, and threadedly fastening bolts and nuts through the mated coupling holes.

9. The cell-to-cell connection structure according to claim 8, wherein the nuts are welded in advance to either one of the mutually overlapped connecting parts of the two adjoining cell-to-cell connection plates, in a layout coincident with the coupling holes.

10. The cell-to-cell connection structure according to claim 8, wherein the bolts and the nuts are made of brass.

11. The cell-to-cell connection structure according to claim 9, wherein the bolts and the nuts are made of brass.

12. The cell-to-cell connection structure according to claim 9, wherein a slit is formed in the connecting part of each of the cell-to-cell connection.

13. The cell-to-cell connection structure according to claim 8, wherein a slit is formed in the connecting part of each of the cell-to-cell connection plates at a location between the pair of coupling holes.

14. The cell-to-cell connection structure according to claim 7, wherein a slit is formed in the connecting part of the cell-to-cell connection plate at a location between the pair of coupling holes.

15. The cell-to-cell connection structure according to claim 1, wherein the welding part of each of the cell-to-cell connection plates has a plurality of projections intended for welding to the first or second electrode terminal of a corresponding cylindrical battery, and a slit is formed between the plurality of projections.

16. The cell-to-cell connection structure according to claim 1, wherein the cell-to-cell connection plates are made of iron, copper, or brass surface-treated with nickel at least one side thereof at least on one side of thereof, or any one of nickel, iron, copper and brass.

17. The cell-to-cell connection structure according to claim 1, wherein two adjoining cell-to-cell connection plates are coated with an insulating paint after being coupled to each other.

18. The cell-to-cell connection structure according to claim 17, wherein a far infrared paint is used as the insulating paint.

* * * * *

UNITED STATES PATENT AND TRADEMARK OFFICE
CERTIFICATE OF CORRECTION

PATENT NO. : 8,178,234 B2  
APPLICATION NO. : 11/918457  
DATED : May 15, 2012  
INVENTOR(S) : Takahiro Fukuoka et al.

Page 1 of 1

It is certified that error appears in the above-identified patent and that said Letters Patent is hereby corrected as shown below:

Title Page, item (56) References Cited: insert

-- FOREIGN PATENT DOCUMENTS

JP   38-25530   9/2006
JP   39-8334    4/2007 --

Signed and Sealed this
Twelfth Day of March, 2013

Teresa Stanek Rea
*Acting Director of the United States Patent and Trademark Office*